Patented Mar. 13, 1923.

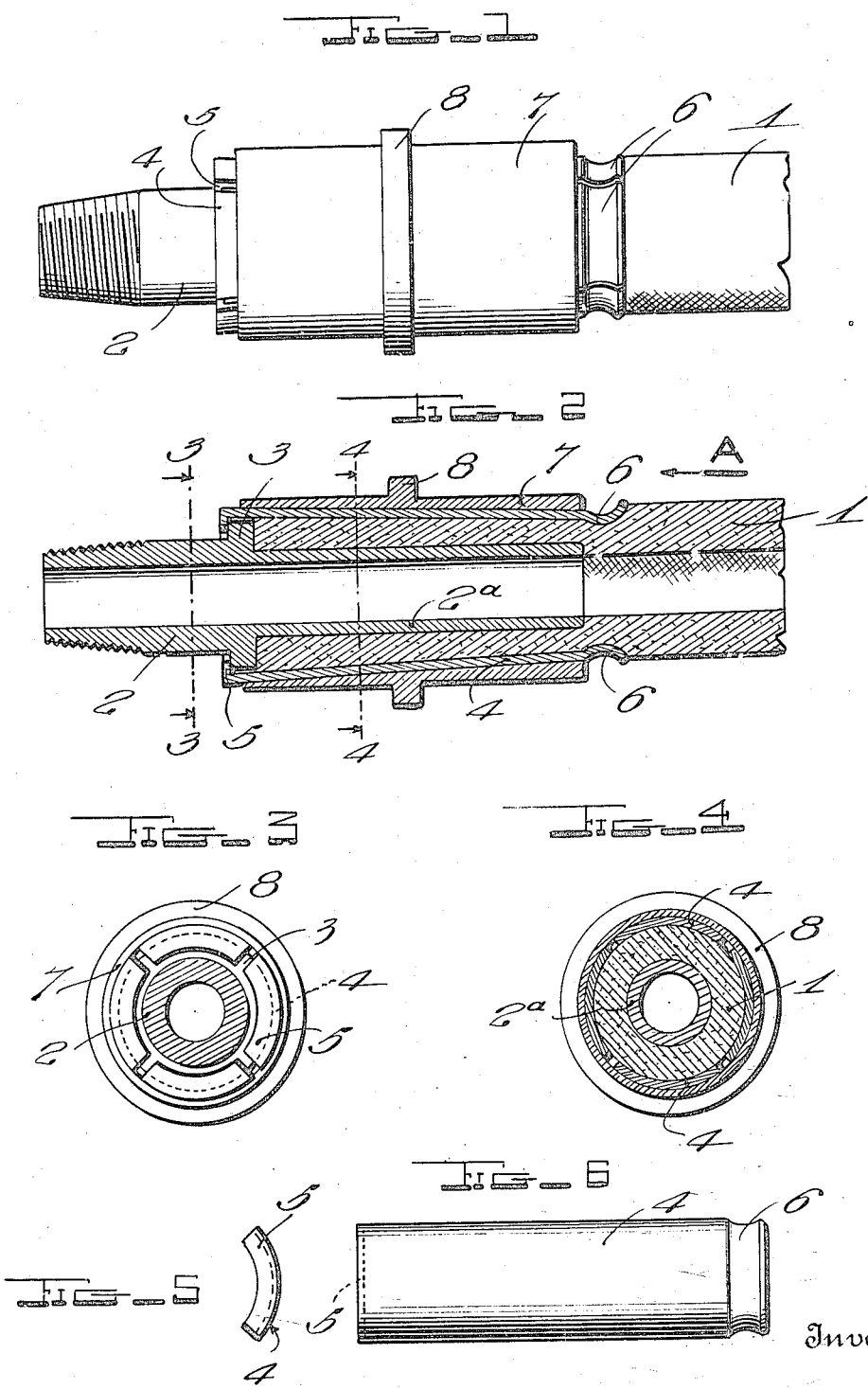

1,448,615

UNITED STATES PATENT OFFICE.

WALTER C. DEIBERT, OF CLIFTON FORGE, VIRGINIA.

HOSE CLAMP.

Application filed March 24, 1921. Serial No. 455,050.

*To all whom it may concern:*

Be it known that I, WALTER C. DEIBERT, a citizen of the United States, residing at Clifton Forge, in the county of Alleghany and State of Virginia, have invented certain new and useful Improvements in Hose Clamps; and I do declare the following to be a full, clear, and exact description of the invention, such as will enable others skilled in the art to which it appertains to make and use the same.

This invention relates to an improved hose coupling and it has for one of its objects to generally improve upon devices of this class by the provision of one of extreme simplicity, and durability, which is easy to attach and detach and is such in construction that it will never become separated from the hose when in use.

Ordinarily, devices of this class include a simple nipple which is inserted into one end of the hose, means of some kind for contracting the hose and forcing it into tight contact with the nipple and means for rendering the last means effective. I find that in many other constructions, the nipple is provided with means, such as ribbed projections for assisting in securing it in place, and as such construction is disastrous to the hose, it is undesirable. Also, the construction of prior art devices with which I am familiar is such that the difference in the diameter of the nipple and hose obstructs free passage of the fluid or liquid therethrough. Furthermore, the constructions are such that there is a possibility of the liquid escaping between the hose and nipple.

In view of the foregoing circumstances, it is my idea to devise a coupling embodying a nipple which has the same diameter as the hose so that when it is in position, its bore is in alinement with the bore of the hose and provides a practically unbroken passage at the point where the inner end of the nipple contacts the adjacent portion of the hose. Thus, free passage of the fluid or liquid is insured and the possibility of escape of liquid between the nipple and hose is absolutely overcome.

It is another and very important object of the invention to provide a coupling wherein the construction of the parts is such that injury to the hose is minimized.

These and other objects and advantages and features of the invention will become apparent during the course of the following description.

In the accompanying drawings forming a part of this specification and in which like numerals are employed to designate like parts throughout the same:

Figure 1 is side elevational view of a section of a hose equipped with a coupling constructed in accordance with my invention.

Figure 2 is a central longitudinal sectional view thereof.

Figures 3 and 4 are transverse sections taken on the lines 3—3 and 4—4 of Figure 2, looking in the direction of the arrows.

Figure 5 is an end elevation of one of the details of the coupling.

Figure 6 is a side elevation thereof.

In the drawings, wherein the preferred embodiment of the invention is clearly illustrated, the numeral 1 designates a portion of a flexible hose and the numeral 2 designates a nipple including a relatively long tubular portion 2ª which is forced into the hose in the manner shown. This nipple is provided with an external laterally extending stop flange 3 which is brought against the end of the hose, serving to limit the insertion of the nipple. Surrounding the hose is a plurality of arcuate contractor-sections 4, these sections being of a length greater than the tubular portion 2ª of the nipple and extending at their outer ends beyond the stop flange 3. At this end, the sections are equipped with laterally extending flanges 5 which extend behind the stop flange 3, while at their opposite ends they are provided with inwardly extending transversely disposed beads 6, which are disposed close to but extend slightly beyond the inner end of the nipple. Surrounding the sections 4 and of a length approximating the length of the portion 2ª of the nipple is a sleeve 7, the bore of which is smooth and tapered so that when it is slid onto the sections 4, it will move the beads 6 inwardly toward each other and thus contract the hose and force it into tight contact with the inner end of the nipple as disclosed in Figure 2. To facilitate the operation of the wedge sleeve 7, it is equipped with an external finger-ring 8.

In assembling the coupling, the nipple is forced into one end of the hose until the stop flange 3 comes into engagement with the end of the hose. Previous to this or after the insertion of the nipple, the wedge sleeve is arranged on the hose at some little distance beyond the nipple. Then, the sections 4 are arranged on the hose with their edges close together and with the flanges 5 engaging the stop flange 3. They are then held in this position with the fingers of one hand and the wedge sleeve 7 is slid from its position in a direction indicated by the arrow A over the sections 4. In so doing, the beads 6 move inwardly toward each other and thus contract the hose 1 so that it is forced tightly into contact with the inner end of the portion 2ª of the nipple. An unbroken passage is thus provided and the possibility of the nipple being blown out by the pressure of the fluid or liquid is practically overcome. Furthermore, the passage of liquid between the nipple and hose, is likewise overcome. With this construction and arrangement, it will be seen that there are no projections or the like to injure the hose, the parts are strong and durable, inexpensive to manufacture and easily placed in position on the hose by inexperienced persons.

A careful consideration of the foregoing description taken in connection with the accompanying drawings is thought to be sufficient to enable persons skilled in the art to which the invention relates to obtain a clear understanding of the same. Therefore, a more lengthy description is deemed unnecessary.

I claim:

A hose clamp comprising a nipple having a comparatively thin tubular extension to telescope into a hose, said extension being free of internal and external projections and depressions to permit it to be of minimum thickness and to provide an unrestricted water passage, and to eliminate the danger of injuring the hose lining; a comparatively thin clamping member for co-action with said extension, said clamping member being free of internal or external projections and depressions and being composed of a plurality of arcuate stamped sections, each section having its outer end directed laterally to provide a flange, the opposite ends of the sections extending beyond the adjacent end of the extension and being bent to form beads for bearing against the hose to force it tightly against the adjacent end of said extension but to eliminate possible injury; a shoulder on the exterior of the aforesaid nipple with which the flanges at the outer ends of said sections are engaged; and an internally smooth wedging sleeve of less length than the sections, said sleeve surrounding the sections and being decreased in diameter toward its inner end to tightly compress the hose a progressively increasing amount from its outer end towards its inner end.

In testimony whereof I have hereunto set my hand.

WALTER C. DEIBERT.